(12) United States Patent
Powell

(10) Patent No.: US 11,440,389 B2
(45) Date of Patent: Sep. 13, 2022

(54) AUTOMATED VEHICLE COVER ASSEMBLY

(71) Applicant: Renae Powell, Everett, WA (US)

(72) Inventor: Renae Powell, Everett, WA (US)

(*) Notice: Subject to any disclaimer, the term of this patent is extended or adjusted under 35 U.S.C. 154(b) by 155 days.

(21) Appl. No.: 16/997,539

(22) Filed: Aug. 19, 2020

(65) Prior Publication Data

US 2022/0055467 A1 Feb. 24, 2022

(51) Int. Cl.
*B60J 11/04* (2006.01)

(52) U.S. Cl.
CPC ................... *B60J 11/04* (2013.01)

(58) Field of Classification Search
CPC .............. B60J 11/02; B60J 11/04; B60J 11/00
USPC .......................................... 296/136.01, 136.11
See application file for complete search history.

(56) References Cited

U.S. PATENT DOCUMENTS

| 2,942,794 | A | * | 6/1960 | Huso | ........................ B60J 11/00 135/90 |
| 4,848,823 | A |   | 7/1989 | Flohr | |
| D330,697  | S |   | 11/1992 | Zhou | |
| 5,795,012 | A |   | 8/1998 | Lion | |
| 6,561,257 | B2 | * | 5/2003 | Huang | .................... B60J 1/2091 160/134 |
| 6,568,737 | B1 | * | 5/2003 | Li | ............................ B60J 11/00 160/370.21 |
| 7,008,002 | B2 |   | 3/2006 | Rhea | |
| 8,752,880 | B1 |   | 6/2014 | Morazan | |
| 9,815,359 | B2 | * | 11/2017 | Morazan | ................... B60J 11/04 |
| 10,220,693 | B2 | * | 3/2019 | Yakubu | ..................... B60J 11/04 |
| 2005/0121937 | A1 | * | 6/2005 | Hudgins | ................... B60J 11/00 296/136.01 |
| 2006/0214465 | A1 | * | 9/2006 | Chau | ........................ B60J 11/00 296/136.1 |
| 2017/0210216 | A1 |   | 7/2017 | Yakubu | |
| 2018/0065456 | A1 | * | 3/2018 | Sun | .......................... B60J 11/04 |

FOREIGN PATENT DOCUMENTS

WO    WO2004080741    9/2004

* cited by examiner

*Primary Examiner* — Joseph D. Pape
*Assistant Examiner* — Veronica M Shull

(57) ABSTRACT

An automated vehicle cover assembly includes a disk that is positioned on a roof of a vehicle. A canopy unit is provided and the canopy unit is movably attached to the disk. The canopy unit is positionable in a deployed position having the canopy unit radiating outwardly from the disk to cover the vehicle for protection against sunlight and precipitation. Conversely, the canopy unit is positionable in a retracted position having the canopy unit positioned beneath the cover. A remote control is in wireless communication with the canopy unit and the remote control actuates the canopy unit into the deployed position or the retracted position.

16 Claims, 7 Drawing Sheets

AUTOMATED VEHICLE COVER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to vehicle cover devices and more particularly pertains to a new vehicle cover device for automatically covering and uncovering a vehicle.

(2) Description of Related Art Including Information Disclosed Under 37 CFR 1.97 and 1.98

The prior art relates to vehicle cover devices including a remotely controlled vehicle cover that includes motorized rollers for deploying a cover over a vehicle. The prior art discloses a vehicle cover that is mounted on a roof of a vehicle and which includes a plurality of arms that have an elbow. The prior art discloses a vehicle cover that includes a central hub mounted on a roof of a vehicle and cover that can be drawn outwardly from the central hub. The prior art discloses an automated vehicle cover that includes a central housing that is actuated to rotate and a canopy unit that is deployed when the central housing rotates. The prior art discloses a variety of manually operated vehicle covers that are mounted to the roof of a vehicle.

BRIEF SUMMARY OF THE INVENTION

An embodiment of the disclosure meets the needs presented above by generally comprising a disk that is positioned on a roof of a vehicle. A canopy unit is provided and the canopy unit is movably attached to the disk. The canopy unit is positionable in a deployed position having the canopy unit radiating outwardly from the disk to cover the vehicle for protection against sunlight and precipitation. Conversely, the canopy unit is positionable in a retracted position having the canopy unit is positioned beneath the cover. A remote control is in wireless communication with the canopy unit and the remote control actuates the canopy unit into the deployed position or the retracted position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
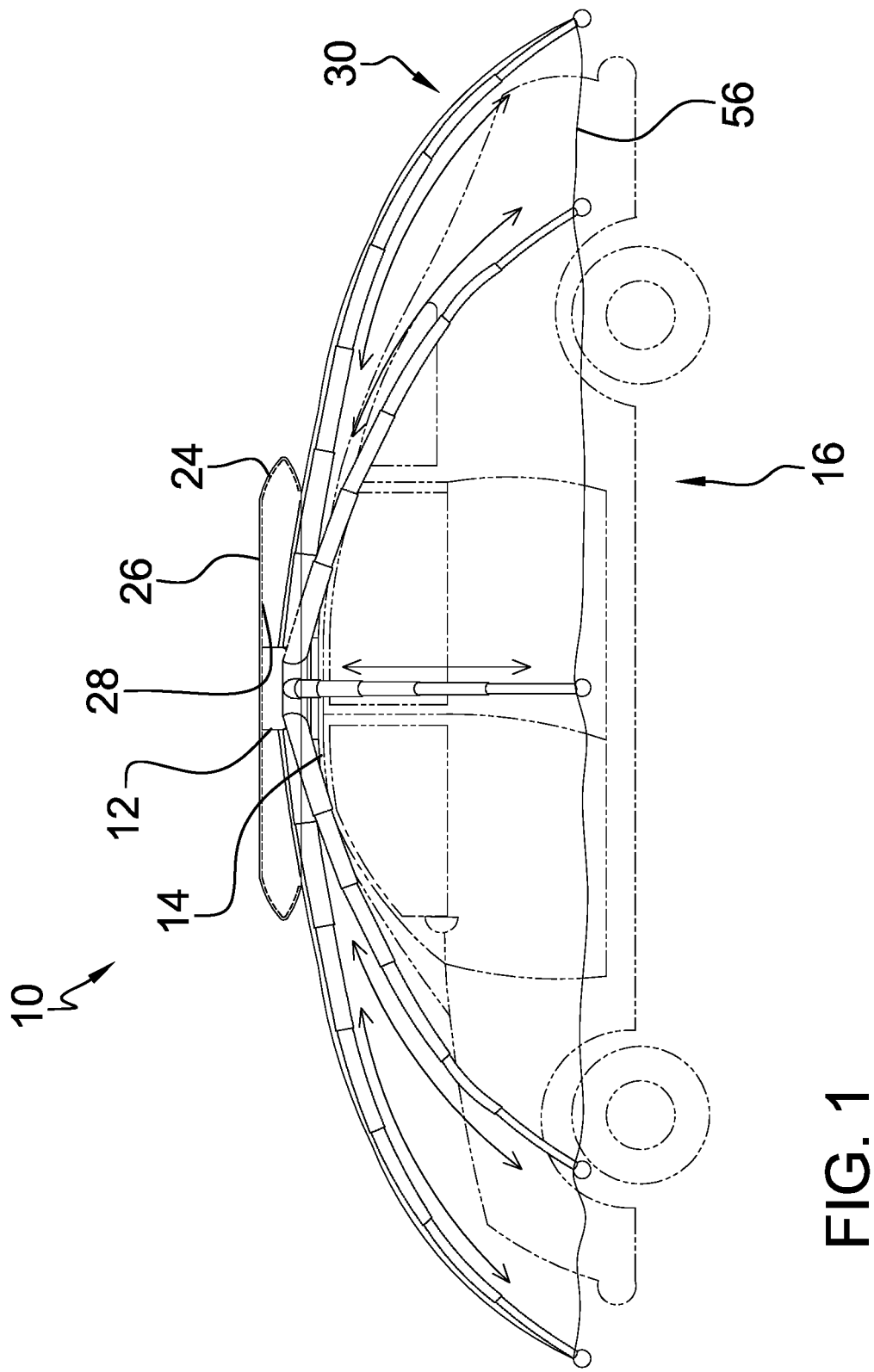
FIG. 1 is a perspective in-use view of an automated vehicle cover assembly according to an embodiment of the disclosure showing a canopy unit in a deployed position.
Figure 2:
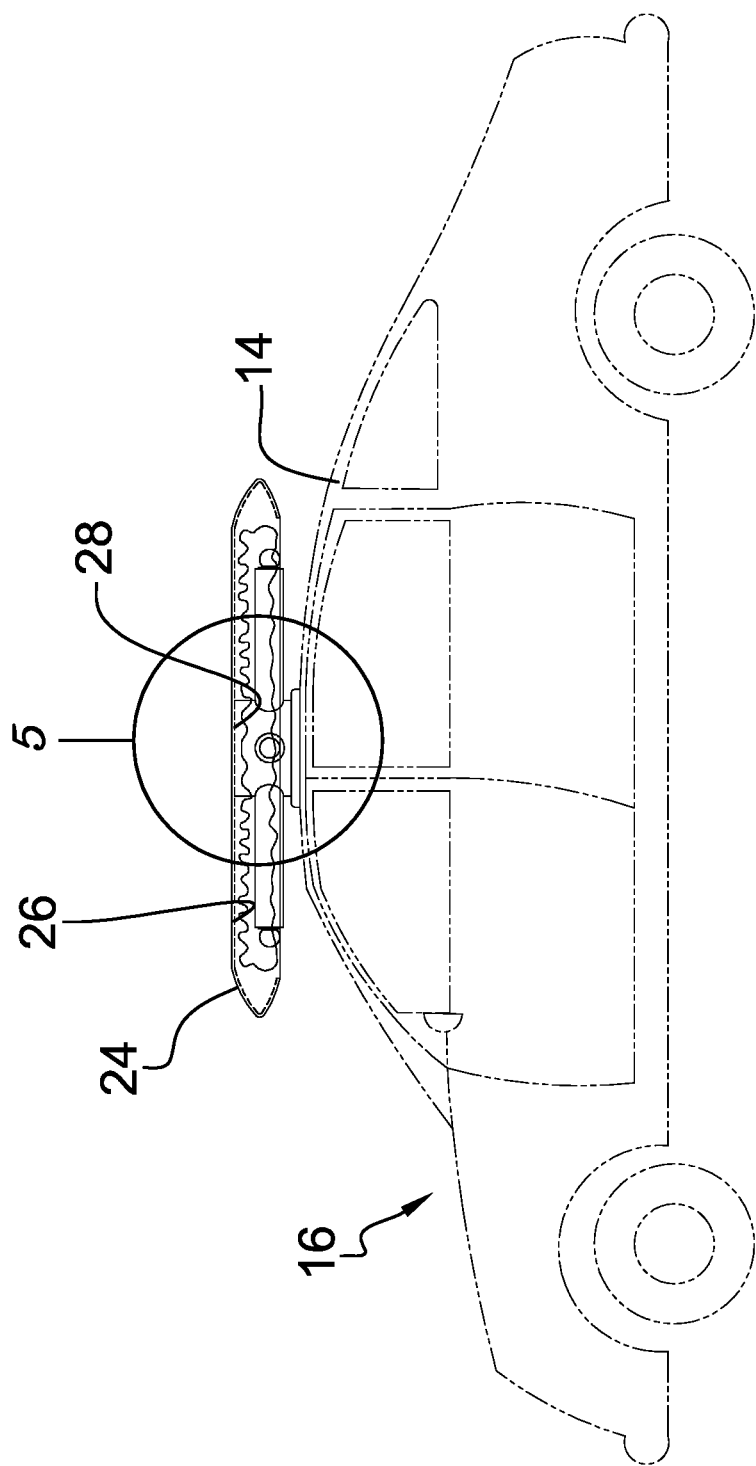
FIG. 2 is a perspective in-use view of an embodiment of the disclosure showing a canopy unit in a retracted position.
Figure 3:
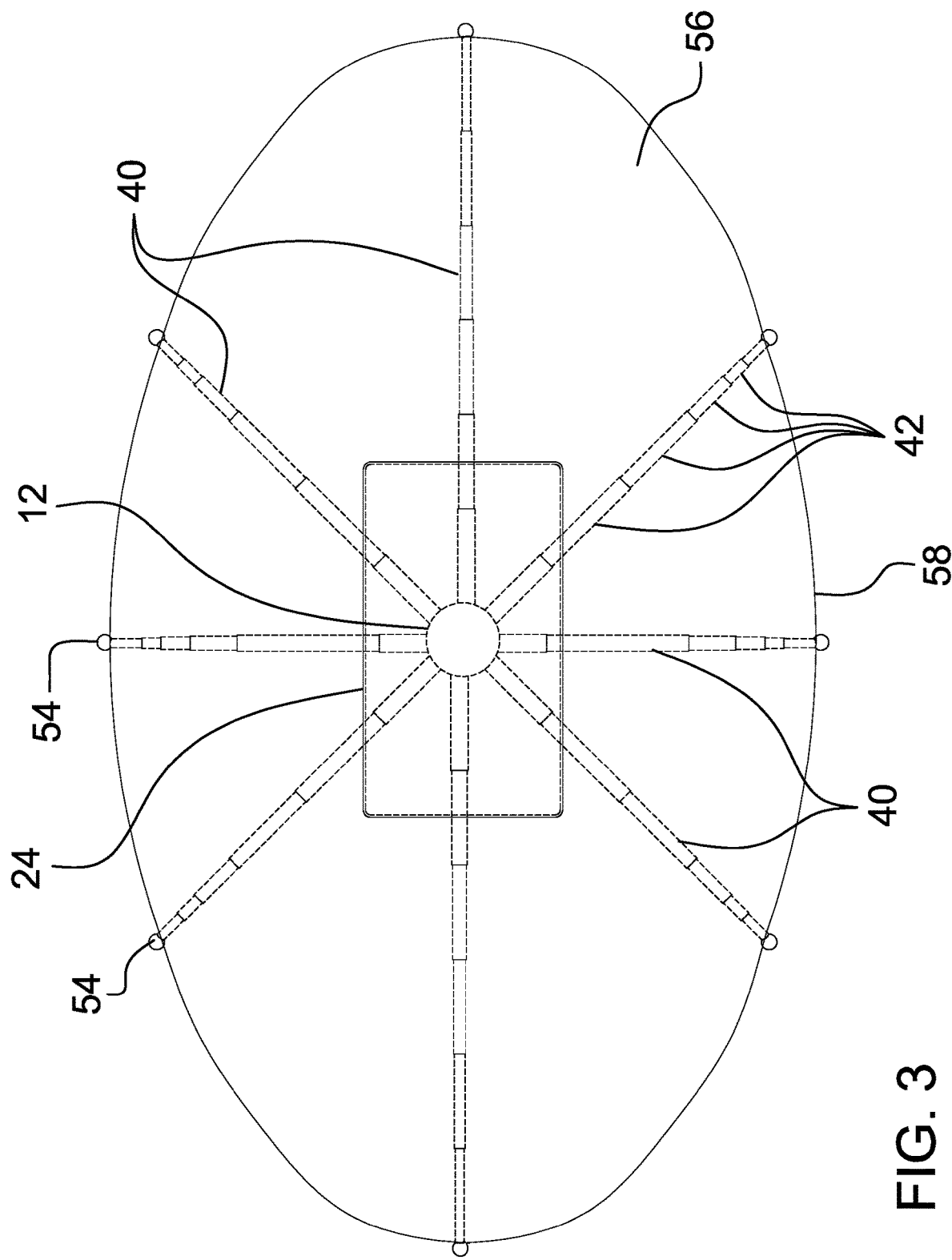
FIG. 3 is a top phantom view of an embodiment of the disclosure showing a canopy unit in a deployed position.
Figure 4:
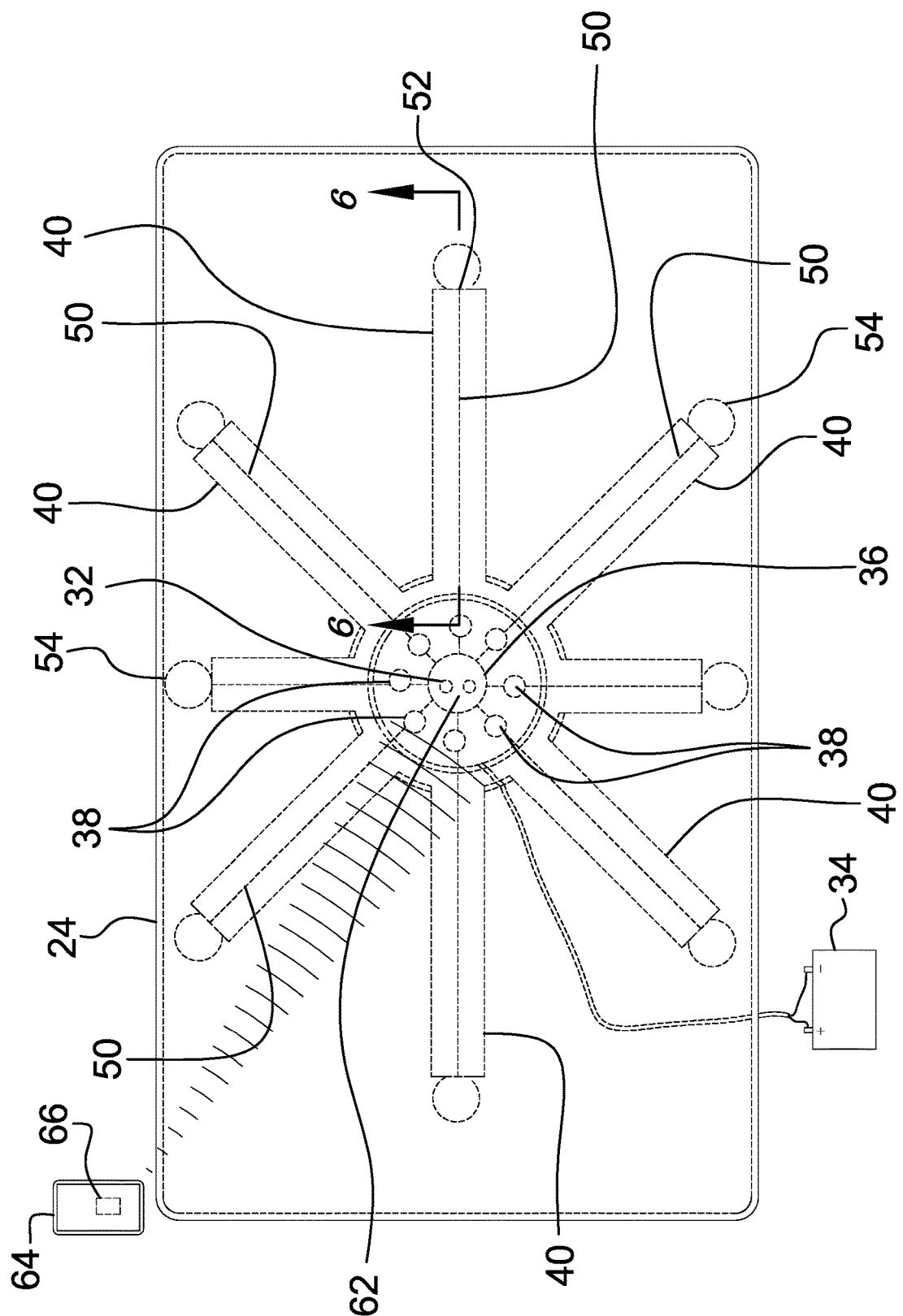
FIG. 4 is a top phantom view of an embodiment of the disclosure showing a canopy unit in a retracted position.
Figure 5:
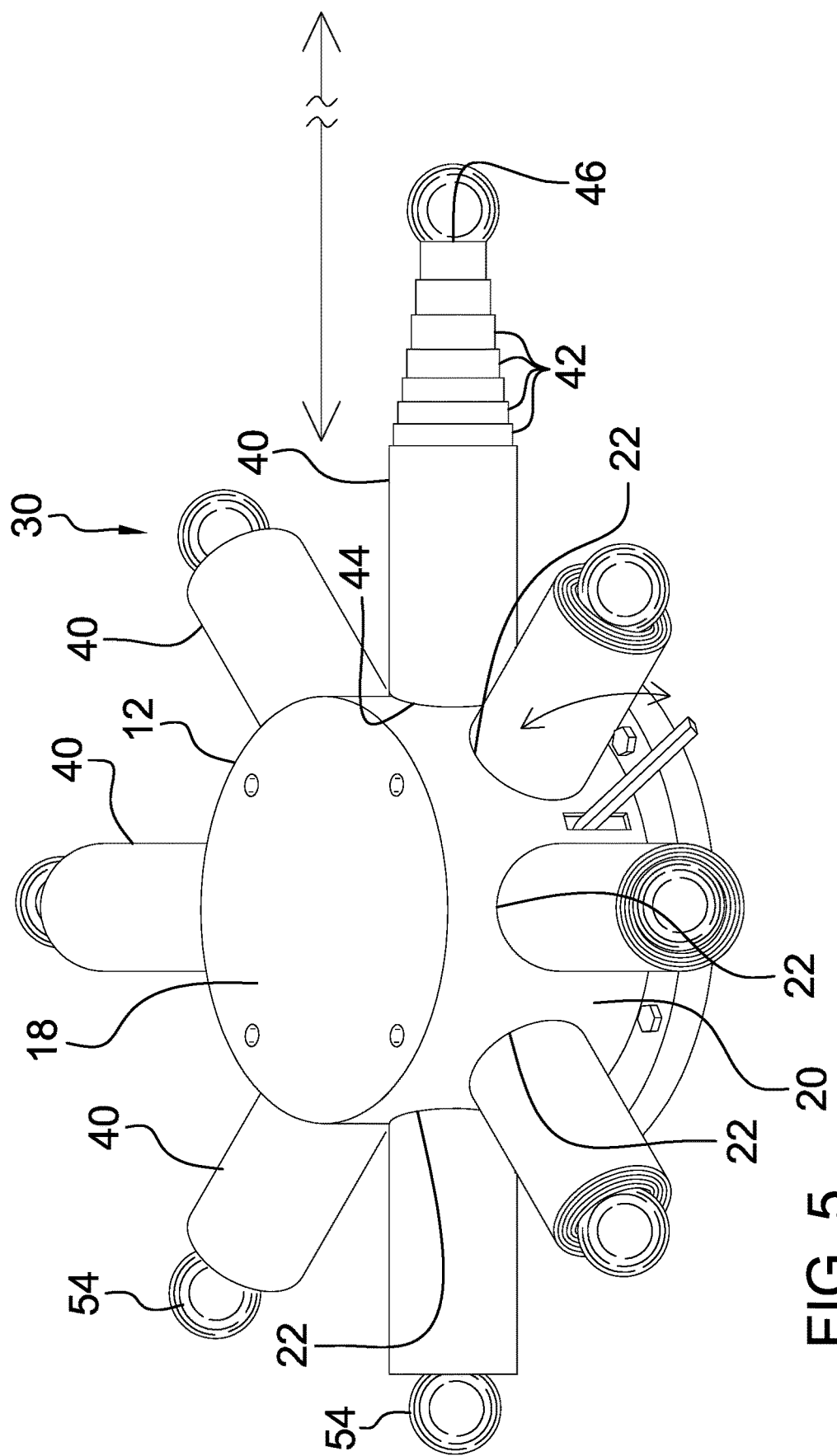
FIG. 5 is a detail view taken from circle 5 of FIG. 2 of an embodiment of the disclosure.
Figure 6:
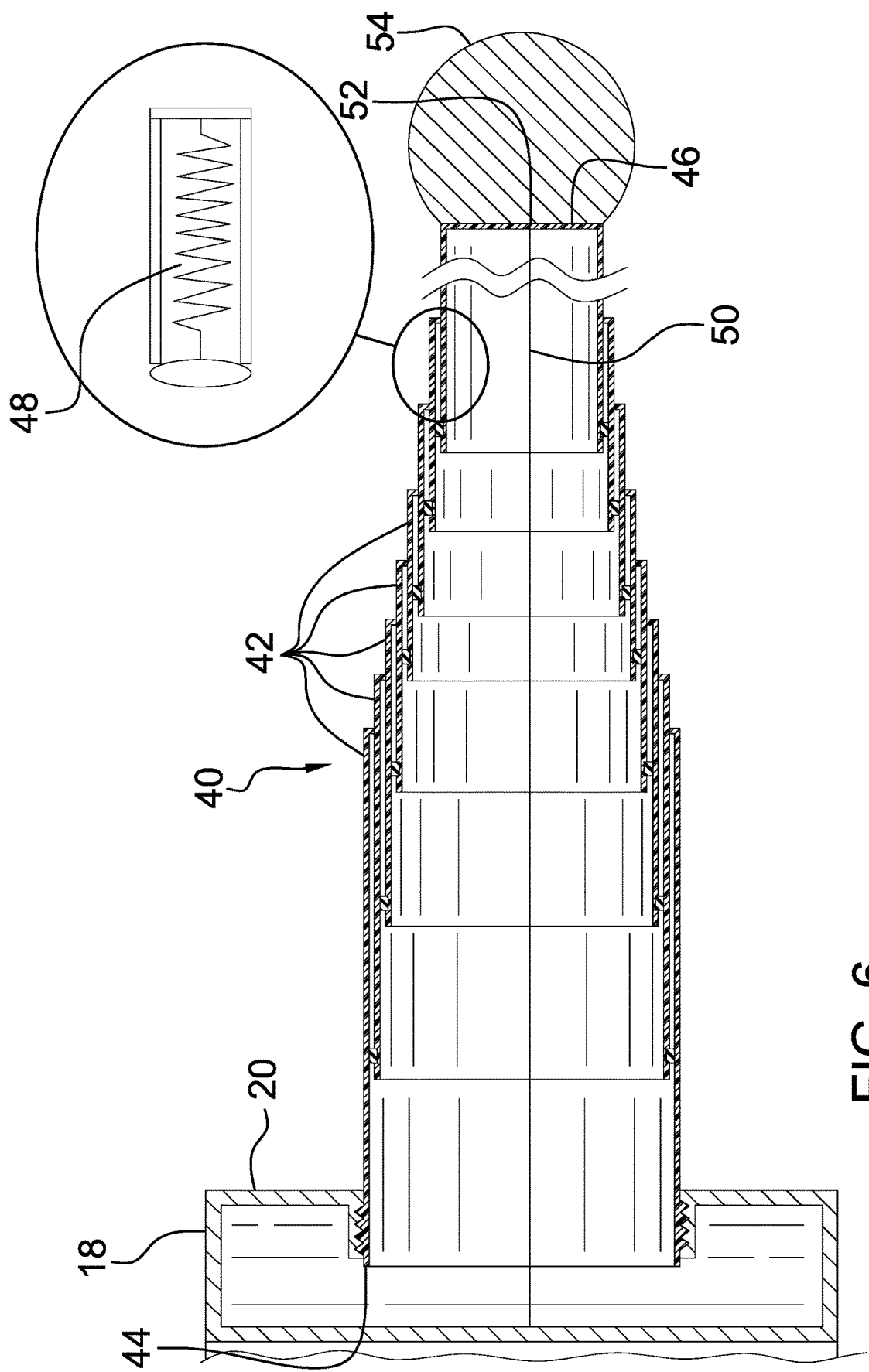
FIG. 6 is a cross sectional view taken along line 6-6 of FIG. 4 of an embodiment of the disclosure.
Figure 7:
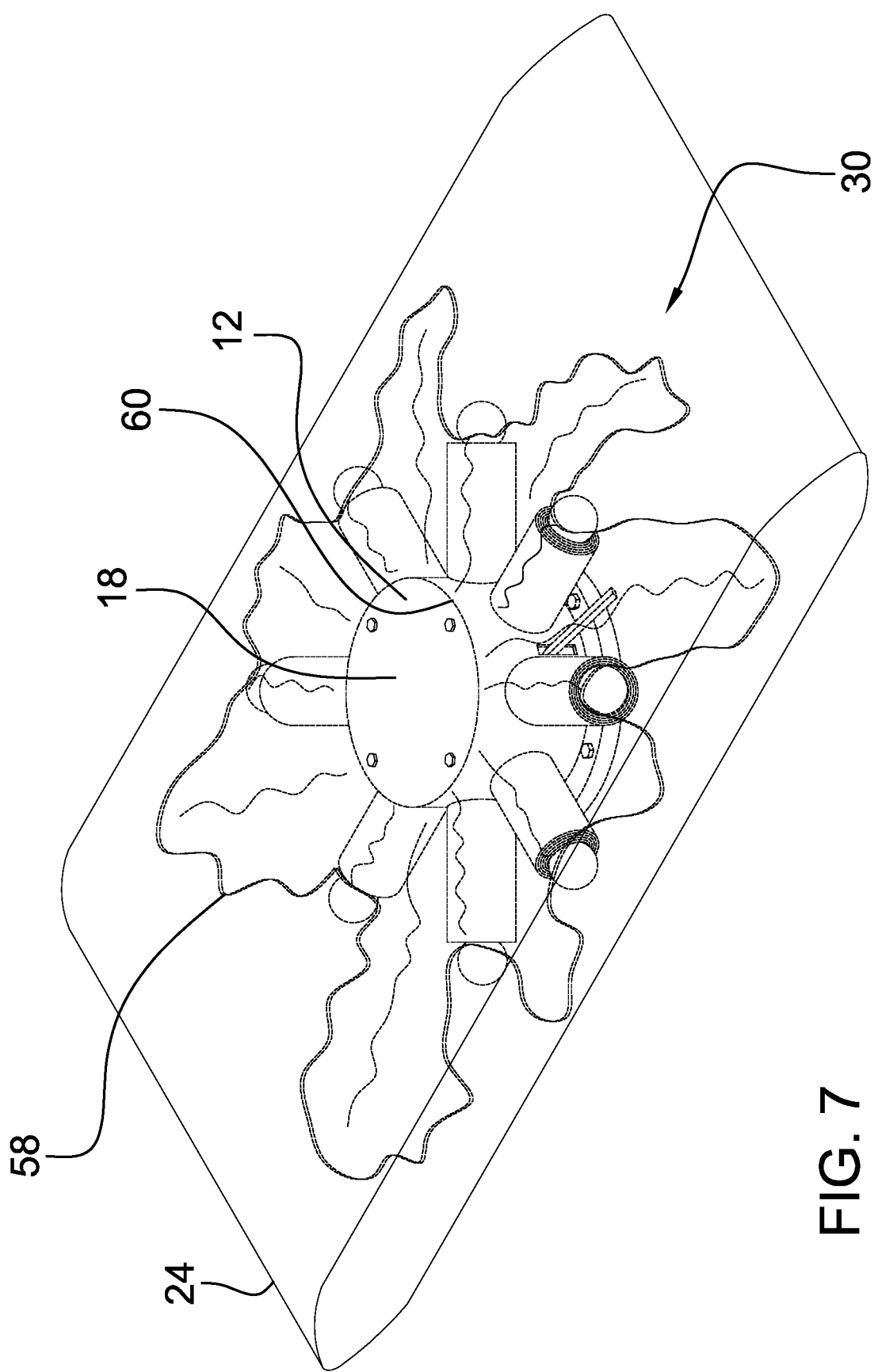
FIG. 7 is a phantom perspective view of an embodiment of the disclosure.

With reference now to the drawings, and in particular to FIGS. 1 through 7 thereof, a new vehicle cover device embodying the principles and concepts of an embodiment of the disclosure and generally designated by the reference numeral 10 will be described.

As best illustrated in FIGS. 1 through 7, the automated vehicle cover assembly 10 generally comprises a disk 12 that is positioned on a roof 14 of a vehicle 16. The vehicle 16 may be a passenger vehicle such as a car or other type of vehicle. The disk 12 is hollow, the disk 12 has a top wall 18 and an outer wall 20, and the outer wall 20 has a plurality of openings 22 each extending into an interior of the disk 12. The openings 22 are spaced apart from each other and are distributed around a full circumference of the disk 12. A cover 24 is coupled to the disk 12 such that the cover 24 is spaced from the roof of the vehicle 16. The cover 24 extends outwardly from the disk 12 in all directions. The cover 24 has an upper panel 26, and a bottom surface 28 of the upper panel 26 is coupled to the top wall 18 of the disk 12.

A canopy unit 30 is provided and the canopy unit 30 is movably attached to the disk 12. The canopy unit 30 is positionable in a deployed position having the canopy unit 30 radiating outwardly from the disk 12. In this way the canopy unit 30 covers the vehicle 16 for protection against sunlight and precipitation. The canopy unit 30 is positionable in a retracted position having the canopy unit 30 being positioned beneath the cover 24. The canopy unit 30 comprises a control circuit 32 that is positioned in the disk 12. The control circuit 32 is electrically coupled to a power source 34 comprising an electrical system of the vehicle 16. Additionally, the control circuit 32 receives an extend input and a retract input.

The canopy unit 30 includes a motor 36 that is positioned in the disk 12 and the motor 36 is electrically coupled to the control circuit 32. The motor 36 rotates in a first direction when the control circuit 32 receives the retract input and the motor 36 rotates in a second direction when the control circuit 32 receives the extend input. The motor 36 may be a two direction electric motor or the like. The canopy unit 30 includes a set of drive gears 38 that is rotatably positioned within the disk 12. Each of the drive gears 38 is in mechanical communication with the motor 36. Each of the drive gears 38 rotates in a first direction when the motor 36 rotates in the first direction. Each of the drive gears 38 rotates in a second direction when the motor 36 rotates in the second direction.

The canopy unit 30 includes a plurality of tubes 40 that each comprises a plurality of sections 42 that slidably engage each other such that each of the tubes 40 has a telescopically adjustable length. Each of the tubes 40 has a first end 44 and a second end 46, and the first end 44 of each of the tubes 40 is coupled to the outer wall 20 of the disk 12. Additionally, the first end 44 of the tubes 40 is aligned with a respective one of the openings 22 in the outer wall 20 of the disk 12. Each of the tubes 40 is positionable in an elongated position having each of the tubes 40 extending outwardly beyond a perimeter of the vehicle 16. Conversely, each of the tubes 40 is positionable in a retracted position having each of the tubes 40 being positioned beneath the cover 24. Each of the sections 42 of each of the tubes 40 is biased to move into the elongated position. As is most clearly shown in FIG. 6, a spring 48, or other biasing member, may be coupled between respective pairs of the sections 42 of the tubes 40 for biasing the tubes 40 into the deployed position.

A plurality of lines 50 is provided and each of the lines 50 is coupled to a respective one of the drive gears 38. Each of the lines 50 extends through a respective one of the tubes 40 and each of the lines 50 has a distal end 52 with respect to the respective drive gear 38. Each of the lines 50 extends outwardly through the second end 46 of the respective tube 40 having the distal end 52 being exposed. Each of the lines 50 is wrapped around the respective drive gear 38 when the motor 36 rotates in the first direction. Conversely, each of the lines 50 is unwrapped from the respective drive gear 38 when the motor 36 rotates in the second direction. Each of the lines 50 may be comprised of nylon or other similar type of resilient, flexible material.

The canopy unit 30 includes a plurality of balls 54 that is each coupled to the distal end 52 of a respective one of the lines 50 having each of the balls 54 abutting the second end 46 of the tube 40 through which the respective line 50 extends. Each of the balls 54 has a diameter that is greater than a diameter of the second end 46 of the tubes 40 thereby inhibiting the balls 54 from entering the second end 46. Each of the balls 54 urges the tubes 40 into the retracted position when the lines 50 are wrapped around the drive gears 38. Additionally, each of the balls 54 facilitates the tubes 40 to be biased into the extended position when the lines 50 are unwrapped from the drive gears 38. Moreover, each of the balls 54 is comprised of a weighted material thereby facilitating each of the tubes 40 to bend downwardly around the vehicle 16 when the tubes 40 are in the extended position.

The canopy unit 30 includes a canopy 56 that has an outer edge 58 and an inner edge 60. The outer edge 58 is concentric with the inner edge 60 such that the inner edge 60 defines a circular opening extending through the canopy 56. The inner edge 60 is coupled to the outer wall 20 of the disk 12 and the canopy 56 lies on top of each of the tubes 40. Additionally, the outer edge 58 is coupled to the second end 46 of each of the tubes 40. The canopy 56 is extended over the vehicle 16 when the tubes 40 are in the elongated position and the canopy 56 is collapsed beneath the cover 24 when the tubes 40 are in the retracted position. The canopy 56 is comprised of an opaque material to shield the vehicle 16 from sunlight. Additionally, the canopy 56 is comprised of a fluid impermeable material to shield the vehicle 16 from precipitation.

The canopy unit 30 includes a receiver 62 that is positioned in the disk 12 and the receiver 62 is electrically coupled to the control circuit 32. A remote control 64 is provided and the remote control 64 is carried by a user. The remote control 64 is in wireless communication with the canopy unit 30 and the remote control 64 actuates the canopy unit 30 into the deployed position or the retracted position. The remote control 64 includes a transmitter 66 that is in wireless communication with the receiver 62. The control circuit 32 receives the extend input when the transmitter 66 broadcasts an extend command to the receiver 62. Additionally, the control circuit 32 receives the retract input when the transmitter 66 broadcasts a retract command to the receiver 62. The receiver 62 may comprise a radio frequency receiver or the like and the receiver 62 may employ Bluetooth communication protocols. The transmitter 66 may comprise a radio frequency transmitter or the like and the transmitter 66 may employ Bluetooth communication protocols. Additionally, the remote control 64 may comprise a personal electronic device, such as a smart phone or other device, which has wireless communication capabilities.

In use, the remote control 64 is manipulated to actuate the canopy unit 30 into the deployed position. In this way the canopy protects the vehicle 16 from sunlight and from precipitation while the vehicle 16 is parked. The remote control 64 is manipulated to actuate the canopy unit 30 into the retracted position. In this way the canopy is retracted beneath the cover 24 thereby facilitating the vehicle 16 to be driven.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An automated vehicle cover assembly being configured to automatically deploy or retract for covering and uncovering a vehicle, said assembly comprising:
    a disk positioned on a roof of a vehicle, said disk being hollow, said disk having a top wall and an outer wall, said outer wall having a plurality of openings each extending into an interior of said disk, said openings being spaced apart from each other and being distributed around a full circumference of said disk;
    a cover being coupled to said disk such that said cover is spaced from the roof of the vehicle, said cover extending outwardly from said disk in all directions, said cover having an upper panel, a bottom surface of said upper panel being coupled to said top wall of said disk;
    a canopy unit being movably attached to said disk, said canopy unit being positionable in a deployed position having said canopy unit radiating outwardly from said disk wherein said canopy unit is configured to cover the vehicle for protection against sunlight and precipitation, said canopy unit being positionable in a retracted position having said canopy unit being positioned beneath said cover; and
    a remote control being carried by a user, said remote control being in wireless communication with said canopy unit, said remote control actuating said canopy unit into said deployed position or said retracted position.

2. The assembly according to claim 1, Wherein said canopy unit comprises a control circuit being positioned in said disk, said control circuit being electrically coupled to a power source comprising an electrical system of the vehicle, said control circuit receiving an extend input and a retract input.

3. The assembly according to claim 2, wherein said canopy unit comprises a motor being positioned in said disk, said motor being electrically coupled to said control circuit, said motor rotating in a first direction when said control circuit receives said retract input, said motor rotating in a second direction when said control circuit receives said extend input.

4. An automated vehicle cover assembly being configured to automatically deploy or retract for covering and uncovering a vehicle, said assembly comprising:
    a disk positioned on a roof of a vehicle;
    a cover being coupled to said disk such that said cover is spaced from the roof of the vehicle, said cover extending outwardly from said disk in all directions;
    a canopy unit being movably attached to said disk, said canopy unit being positionable in a deployed position having said canopy unit radiating outwardly from said disk wherein said canopy unit is configured to cover the vehicle for protection against sunlight and precipitation, said canopy unit being positionable in a retracted position having said canopy unit being positioned beneath said cover;
    a remote control being carried by a user, said remote control being in wireless communication with said canopy unit, said remote control actuating said canopy unit into said deployed position or said retracted position
    wherein said canopy unit comprises a control circuit being positioned in said disk, said control circuit being electrically coupled to a power source comprising an electrical system of the vehicle, said control circuit receiving an extend input and a retract input;
    wherein said canopy unit comprises a motor being positioned in said disk, said motor being electrically coupled to said control circuit, said motor rotating in a first direction when said control circuit receives said retract input, said motor rotating in a second direction when said control circuit receives said extend input; and
    wherein said canopy unit comprises a set of drive gears, said set of drive gears being rotatably positioned within said disk, each of said drive gears being in mechanical communication with said motor, each of said drive gears rotating in a first direction when said motor rotates in said first direction, each of said drive gears rotating in a second direction when said motor rotates in said second direction.

5. The assembly according to claim 1, wherein said canopy unit comprises a plurality of tubes, each of said tubes comprising a plurality of sections that slidably engage each other such that each of said tubes has a telescopically-adjustable length, each of said tubes having a first end and a second end, said first end of each of said tubes being coupled to said outer wall of said disk having said first end of said tubes being aligned with a respective one of said openings in said outer wall of said disk.

6. The assembly according to claim 5, wherein each of said tubes is positionable in an elongated position having each of said tubes extending outwardly beyond a perimeter of the vehicle, each of said tubes being positionable in a retracted position having each of said tubes being positioned beneath said cover, each of said sections of each of said tubes being biased to move into said elongated position.

7. The assembly according to claim 5, wherein said canopy unit comprises:
    a motor rotating in a first direction or a second direction;
    a set of drive gears being in mechanical communication with said motor; and
    a plurality lines, each of said lines being coupled to a respective one of said drive gears, each of said lines extending through a respective one of said tubes, each of said lines having a distal end with respect to said respective drive gear, each of said lines extending outwardly through said second end of said respective tube having said distal end being exposed, each of said lines being wrapped around said respective drive gear when said motor rotates in said first direction, each of said lines being unwrapped from said respective drive gear when said motor rotates in said second direction.

8. The assembly according to claim 7, wherein said canopy unit comprises a plurality of balls, each of said balls being coupled to said distal end of a respective one of said lines having each of said balls abutting said second end of said tube through which said respective line extends, each of said balls having a diameter being greater than a diameter of said second end of said tubes thereby inhibiting said balls from entering said second end.

9. The assembly according to claim 8, wherein each of said balls urges said tubes into said retracted position when said lines are wrapped around said drive gears, each of said balls facilitating said tubes to be biased into said extended position when said lines are unwrapped from said drive gears.

10. The assembly according to claim 6, wherein said canopy unit comprises a canopy having an outer edge and an inner edge, said outer edge being concentric with said inner edge such that said inner edge defines a circular opening extending through said canopy, said inner edge being coupled to said outer wall of said disk, said canopy lying on top of each of said tubes, said outer edge being coupled to said second end of each of said tubes.

11. The assembly according to claim 10, wherein said canopy is extended over the vehicle when said tubes are in said elongated position, said canopy being collapsed beneath said cover when said tubes are in said retracted position.

12. The assembly according to claim 10, wherein said canopy is comprised of an opaque material wherein said canopy is configured to shield the vehicle from sunlight.

13. The assembly according to claim 12, wherein said canopy is comprised of a fluid impermeable material wherein said canopy is configured to shield to vehicle from precipitation.

14. The assembly according to claim 1, wherein said canopy unit comprises a receiver being positioned in said disk, said receiver being electrically coupled to said control circuit.

15. The assembly according to claim 14, wherein said remote control includes a transmitter being in wireless communication with said receiver, said control circuit receiving said extend input when said transmitter broadcasts an extend command to said receiver, said control circuit receiving said retract input when said transmitter broadcasts a retract command to said receiver.

16. An automated vehicle cover assembly being configured to automatically deploy or retract for covering and uncovering a vehicle, said assembly comprising:
  a disk positioned on a roof of a vehicle, said disk being hollow, said disk having a top wall and an outer wall, said outer wall having a plurality of openings each extending into an interior of said disk, said openings being spaced apart from each other and being distributed around a full circumference of said disk;
  a cover being coupled to said disk such that said cover is spaced from the roof of the vehicle, said cover extending outwardly from said disk in all directions, said cover having an upper panel, a bottom surface of said upper panel being coupled to said top wall of said disk;
  a canopy unit being movably attached to said disk, said canopy unit being positionable in a deployed position having said canopy unit radiating outwardly from said disk wherein said canopy unit is configured to cover the vehicle for protection against sunlight and precipitation, said canopy unit being positionable in a retracted position having said canopy unit being positioned beneath said cover, said canopy unit comprising:
  a control circuit being positioned in said disk, said control circuit being electrically coupled to a power source comprising an electrical system of the vehicle, said control circuit receiving an extend input and a retract input;
  a motor being positioned in said disk, said motor being electrically coupled to said control circuit, said motor rotating in a first direction when said control circuit receives said retract input, said motor rotating in a second direction when said control circuit receives said extend input;
  a set of drive gears, said set of drive gears being rotatably positioned within said disk, each of said drive gears being in mechanical communication with said motor, each of said drive gears rotating in a first direction when said motor rotates in said first direction, each of said drive gears rotating in a second direction when said motor rotates in said second direction;
  a plurality of tubes, each of said tubes comprising a plurality of sections that slidably engage each other such that each of said tubes has a telescopically adjustable length, each of said tubes having a first end and a second end, said first end of each of said tubes being coupled to said outer wall of said disk having said first end of said tubes being aligned with a respective one of said openings in said outer wall of said disk, each of said tubes being positionable in an elongated position having each of said tubes extending outwardly beyond a perimeter of the vehicle, each of said tubes being positionable in a retracted position having each of said tubes being positioned beneath said cover, each of said sections of each of said tubes being biased to move into said elongated position;
  a plurality of lines, each of said lines being coupled to a respective one of said drive gears, each of said lines extending through a respective one of said tubes, each of said lines having a distal end with respect to said respective drive gear, each of said lines extending outwardly through said second end of said respective tube having said distal end being exposed, each of said lines being wrapped around said respective drive gear when said motor rotates in said first direction, each of said lines being unwrapped from said respective drive gear when said motor rotates in said second direction;
  a plurality of balls, each of said balls being coupled to said distal end of a respective one of said lines having each of said balls abutting said second end of said tube through which said respective line extends, each of said balls having a diameter being greater than a diameter of said second end of said tubes thereby inhibiting said balls from entering said second end, each of said balls urging said tubes into said retracted position when said lines are wrapped around said drive gears, each of said balls facilitating said tubes to be biased into said extended position when said lines are unwrapped from said drive gears;
  a canopy having an outer edge and an inner edge, said outer edge being concentric with said inner edge such that said inner edge defines a circular opening extending through said canopy, said inner edge being coupled to said outer wall of said disk, said canopy lying on top of each of said tubes, said outer edge being coupled to said second end of each of said tubes, said canopy being extended over the vehicle when said tubes are in said elongated position, said canopy being collapsed beneath said cover when said tubes are in said retracted position, said canopy being comprised of a opaque material wherein said canopy is configured to shield the vehicle from sunlight, said canopy being comprised of a fluid impermeable material wherein said canopy is configured to shield to vehicle from precipitation; and
  a receiver being positioned in said disk, said receiver being electrically coupled to said control circuit; and
  a remote control being carried by a user, said remote control being in wireless communication with said canopy unit, said remote control actuating said canopy unit into said deployed position or said retracted position, said remote control including a transmitter being in wireless communication with said receiver, said control circuit receiving said extend input when said transmitter broadcasts an extend command to said receiver, said control circuit receiving said retract input when said transmitter broadcasts a retract command to said receiver.

* * * * *